3,123,616
PROCESS FOR PRODUCING 1,2-DIPHENYL-3,5-DI-OXO-4-(GAMMA-OXYBUTYL)-PYRAZOLIDINE
Jiří Mayer and Josef Čtvrtník, Olomouc, and Oldřich Němeček, Prague, Czechoslovakia, assignors to Spofa, Sdruzeni podniku pro zdravotnickou vyrobu, Prague-Zizkov, Czechoslovakia
No Drawing. Filed May 24, 1961, Ser. No. 136,684
Claims priority, application Czechoslovakia May 27, 1960
15 Claims. (Cl. 260—310)

This invention relates to a process for producing 1,2-diphenyl-3,5-dioxo-4-(gamma-oxybutyl)-pyrazolidine, so called ketophenylbutazone, of the following formula

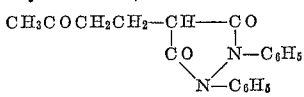

which is a new effective drug against inflammatory diseases (Z. Horáková et al.: Arzneimittel-Forsch. 8, 229, 1958).

The known method of manufacture of this compound (J. Čtvrtnik et al.; Českosl. farmacie 7, 303, 1958; U.S. Patent No. 2,773,880) consists in reacting 4-(gamma-chloro crotyl)-1,2-diphenyl-3,5-dioxopyrazolidine with concentrated sulfuric acid, and in treating the enolester thus formed by hydrolysis to give ketophenylbutazone.

According to clinical trials, especially in the treatment of gout, this new drug is much more advantageous in comparison with the so far used 4-n-butyl-1,2-diphenyl-3,5-dioxo-pyrazolidine (phenylbutazone) because of lower toxicity and fewer side effects.

The new method of manufacture of 1,2-diphenyl-3,5-dioxo - 4 - (gamma-oxybutyl) - pyrazolidine (ketophenylbutazone) according to the invention consists in the condensation of 1,2-diphenyl-3,5-dioxo-pyrazolidine with methyl vinyl ketone, preferably in the presence of condensation agents, such as hydroxides, alcoholates, or alkali metal carbonates, or possibly organic bases, such as pyridine, piperidine, or diethylamine. As a suitable medium for the condensation there may be used organic solvents, such as esters of saturated aliphatic monocarboxylic acids having 1-2 carbon atoms and alkanols having 1-5 carbon atoms, preferably ethyl acetate. An alternative procedure consists in condensing a salt of 1,2-diphenyl-3,5-dioxo-pyrazolidine with an alkali metal. The condensation proceeds favorably at elevated temperature, preferably close to the boiling point of the reaction mixture.

The procedure according to the invention is very simple, yielding in one step the desired compound which can be readily isolated in the usual way, i.e. by acidification.

The necessary methyl vinyl ketone is obtained by hydration of vinyl acetylene, or in a single reaction step from 1,3-dichlorobutene-2, which is a waste product in the rubber industry so far without any other use.

The above-mentioned procedures featuring the introduction of the $CH_3COCH_2CH_2$— group by means of methyl vinyl ketone can be applied to the entire series of pyrazolidine derivatives of the general formula

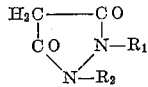

in which the substituents $R_1$ and $R_2$ (identical or different) can be straight or branched alkyl radicals with 1-10 carbon atoms, or closed in the form of a cyclic alkyl, or phenyls, possibly substituted in various positions with alkyls or alkoxyls with 1-4 carbon atoms, or halogens, or heterocyclic residues.

The present invention is illustrated by the following examples which, however, do not limit the scope of the invention.

Example 1

25 g. of sodium salt of 1,2-diphenyl-3,5-dioxo pyrazolidine are suspended in 100 ml. of ethyl acetate, 8 g. of methyl vinyl ketone are added dropwise, the mixture is heated to its boiling point and refluxed for 1 hour. Then the solvent is evaporated and the residue dissolved in 10% aqueous solution of sodium hydroxide, the solution is filtered with activated charcoal and the crude reaction product is precipitated from the filtrate by acidification with acetic acid. Recrystallization from aqueous ethanol or acetone yields the desired ketophenylbutazone, melting at 126–128° C. Very pure product can be obtained by an alternative procedure. Crude ketophenylbutazone is dissolved in 10 parts of chloroform, or some other nonpolar solvent, and purified by passing over a column of alumina. The solvent is evaporated to dryness and the residue recrystallized from aqueous ethanol or methanol. The yield amounts to 50–60% of the theoretical.

Example 2

10 g. of 1,2-diphenyl-3,5-dioxo-pyrazolidine are dissolved in 50 ml. of ethyl acetate and to this solution 10 g. of calcined potash are added. Then the mixture is treated dropwise with 3.2 g. of methyl vinyl ketone, heated to boiling and refluxed for 1 hour. Finally the reaction mixture is cooled, the potash is filtered off and the filtrate is worked up as in Example 1. This method gives ketophenylbutazone in a yield of 60–70%; melting point 126–128° C.

We claim:

1. The method of producing a compound of the formula:

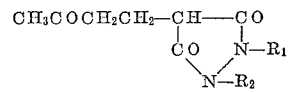

wherein $R_1$ and $R_2$ are each selected from the group consisting of alkyl of up to 10 carbon atoms, cycloalkyl, phenyl, alkylphenyl wherein alkyl is up to 4 carbon atoms, alkoxyphenyl wherein alkoxy is up to 4 carbon atoms and halophenyl, which comprises condensing a compound selected from the group consisting of compounds of the formula:

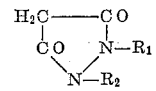

wherein $R_1$ and $R_2$ have the same definitions as above, and alkali metal salts thereof with methyl vinyl ketone.

2. The method of producing 1,2-diphenyl-3,5-dioxo-4-(gamma-oxybutyl)-pyrazolidine of the formula:

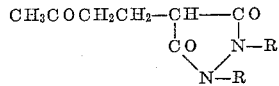

wherein R is phenyl, which comprises condensing 1,2-diphenyl-3,5-dioxo-pyrazolidine with methyl vinyl ketone.

3. The method of producing 1,2-diphenyl-3,5-dioxo-4-(gamma-oxybutyl)-pyrazolidine of the formula:

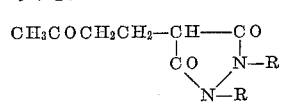

wherein R is phenyl, which comprises condensing 1,2-diphenyl-3,5-dioxo-pyrazolidine with methyl vinyl ketone in the presence of a condensation agent.

4. The method of producing 1,2-diphenyl-3,5-dioxo-4-(gamma-oxybutyl)-pyrazolidine of the formula:

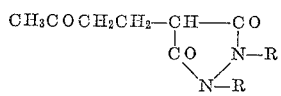

wherein R is phenyl, which comprises condensing 1,2-diphenyl-3,5-dioxo-pyrazolidine with methyl vinyl ketone in the presence of an inorganic condensation agent selected from the group consisting of alkali metal hydroxides, carbonates and alcoholates.

5. The method of producing 1,2-diphenyl-3,5-dioxo-4-(gamma-oxybutyl)-pyrazolidine of the formula:

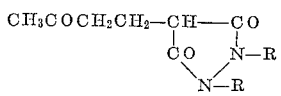

wherein R is phenyl, which comprises condensing 1,2-diphenyl-3,5-dioxo-pyrazolidine with methyl vinyl ketone in the presence of an organic condensation agent selected from the group consisting of pyridine, piperidine and diethylamine.

6. The method of producing 1,2-diphenyl-3,5-dioxo-4-(gamma-oxybutyl)-pyrazolidine of the formula:

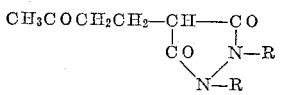

wherein R is phenyl, which comprises condensing 1,2-diphenyl-3,5-dioxo-pyrazolidine with methyl vinyl ketone in the presence of an organic base as condensation agent.

7. The method of producing 1,2-diphenyl-3,5-dioxo-4-(gamma-oxybutyl)-pyrazolidine of the formula:

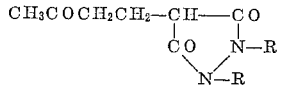

wherein R is phenyl, which comprises condensing 1,2-diphenyl-3,5-dioxo-pyrazolidine with methyl vinyl ketone in an organic solvent medium.

8. The method of producing 1,2-diphenyl-3,5-dioxo-4-(gamma-oxybutyl)-pyrazolidine of the formula:

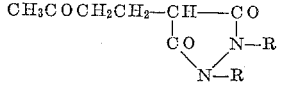

wherein R is phenyl, which comprises condensing 1,2-diphenyl-3,5-dioxo-pyrazolidine with methyl vinyl ketone in the medium of a 1–5 carbon atom alkanolic ester of a saturated aliphatic monocarboxylic acid of 1-2 carbon atoms.

9. The method of producing 1,2-diphenyl-3,5-dioxo-4-(gamma-oxybutyl)-pyrazolidine of the formula:

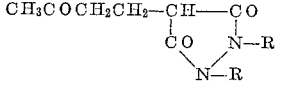

wherein R is phenyl, which comprises condensing 1,2-diphenyl-3,5-dioxo-pyrazolidine with methyl vinyl ketone in the presence of a condensation agent in an organic solvent medium.

10. The method of producing 1,2-diphenyl-3,5-dioxo-4-(gamma-oxybutyl)-pyrazolidine of the formula:

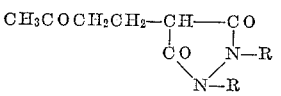

wherein R is phenyl, which comprises condensing 1,2-diphenyl-3,5-dioxo-pyrazolidine with methyl vinyl ketone in the presence of a condensation agent in the medium of ethyl acetate.

11. The method of producing 1,2-diphenyl-3,5-dioxo-4-(gamma-oxybutyl)-pyrazolidine of the formula:

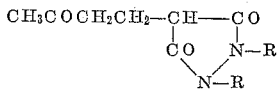

wherein R is phenyl, which comprises condensing 1,2-diphenyl-3,5-dioxo-pyrazolidine with methyl vinyl ketone in an organic solvent medium at a temperature up to the boiling point.

12. The method of producing 1,2-diphenyl-3,5-dioxo-4-(gamma-oxybutyl)-pyrazolidine of the formula:

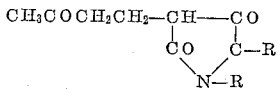

wherein R is phenyl, which comprises condensing an alkali metal salt of 1,2-diphenyl-3,5-dioxo-pyrazolidine with methyl vinyl ketone.

13. The method of producing 1,2-diphenyl-3,5-dioxo-4-(gamma-oxybutyl)-pyrazolidine of the formula:

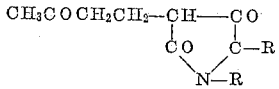

wherein R is phenyl, which comprises condensing an alkali metal salt of 1,2-diphenyl-3,5-dioxo-pyrazolidine with methyl vinyl ketone in the presence of a condensation agent.

14. The method of producing 1,2-diphenyl-3,5-dioxo-4-(gamma-oxybutyl)-pyrazolidine of the formula:

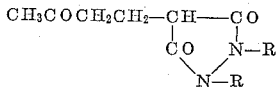

wherein R is phenyl, which comprises condensing an alkali metal of 1,2-diphenyl-3,5-dioxo-pyrazolidine with methyl vinyl ketone in an organic solvent medium.

15. The method of producing 1,2-diphenyl-3,5-dioxo-4-(gamma-oxybutyl)-pyrazolidine of the formula:

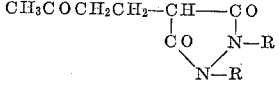

wherein R is phenyl, which comprises condensing an alkali metal salt of 1,2-diphenyl-3,5-dioxo-pyrazolidine with methyl vinyl ketone in the presence of a condensation agent in an organic solvent medium.

References Cited in the file of this patent

UNITED STATES PATENTS 2,542,223     Wendler et al.     Feb. 20, 1951

FOREIGN PATENTS 1,038,049     Germany     Sept. 4, 1958

OTHER REFERENCES

MacArdle: "The Use of Solvents in Syn. Org. Chem." (Van Nostrand), pp. 1–3 (1925).

Gilman: Organic Chemistry (Wiley & Sons), pp. 581–588 (1938).

Adams et al.: "Organic Reactions," vol. 5, pp. 80–81, 109 (1949).

Jacobs Pyrazoles and Related Compounds, page 148; in: Elderfield Heterocyclic Compounds, vol. 5, N.Y., Wiley, 1957.

Bergmann: The Michael Reaction, pages 182–5, 270, 278–84; in: Organic Reactions, vol. 10, N.Y., Wiley, 1959.